United States Patent [19]
Adachi et al.

[11] Patent Number: 5,415,751
[45] Date of Patent: May 16, 1995

[54] METHOD OF PRODUCING ACIDS AND ALKALIS

[75] Inventors: Hiroyuki Adachi, Iyo; Fumio Hanada, Tokuyama, both of Japan

[73] Assignees: Tokuyama Corporation, Yamaguchi; Daio Paper Corporation, Ehime, both of Japan

[21] Appl. No.: 109,713

[22] Filed: Aug. 20, 1993

[30] Foreign Application Priority Data

Aug. 21, 1992 [JP] Japan .................................. 4-222603

[51] Int. Cl.⁶ ............................................. B01D 61/44
[52] U.S. Cl. ................................. 204/182.4; 204/98; 204/103; 204/104
[58] Field of Search ............... 204/98, 103, 104, 182.4, 204/151

[56] References Cited

U.S. PATENT DOCUMENTS

| | | | |
|---|---|---|---|
| 2,829,095 | 4/1958 | Oda et al. | 204/98 |
| 4,740,281 | 3/1988 | Chlanda et al. | 204/151 |
| 5,328,563 | 7/1994 | Henricson | 162/30.1 |

OTHER PUBLICATIONS

Aquatech Systems Brochure (1985) no month pp. 1–12.

*Primary Examiner*—John Niebling
*Assistant Examiner*—Arun S. Phasge
*Attorney, Agent, or Firm*—Sherman & Shalloway

[57] ABSTRACT

To reuse ashes that are left after burning components contained in a black liquor obtained by digesting wood chips in the step of producing kraft pulps. Acids and alkalis are produced by burning components contained in a black liquor obtained by digesting wood chips and by decomposing an aqueous solution of the thus obtained ashes through the electrodialysis by using a bipolar membrane and a cation-exchange membrane and/or an anion-exchange membrane.

19 Claims, 1 Drawing Sheet

METHOD OF PRODUCING ACIDS AND ALKALIS

BACKGROUND OF THE INVENTION

1. Field of the Invention

The present invention relates to a method of producing acids and alkalis using, as starting materials, ashes obtained by burning components contained in a black liquor that is obtained by digesting wood chips in the pulp and paper industry.

2. Prior Art

In a process of producing kraft pulps in the pulp and paper industry, digestion has been carried out in which a white liquor consisting of sodium sulfide and caustic soda is added to the wood chips to dissolve lignin. This digestion forms a waste liquor called black liquor which contains organic matters such as lignin and resin components as well as inorganic matters. The black liquor is concentrated and is burned in a recovery boiler, whereby inorganic matters are mostly reduced in the furnace, taken out from the lower part of the recovery boiler in the form of smelts (molten salts) consisting of sodium sulfide and sodium carbonate, and are recovered as a green liquor. Thereafter, the green liquor is mixed with slaked lime in a step of causticization, and the sodium carbonate contained in the green liquor is transformed into the caustic soda and is recovered as a white liquor which can be used again.

In burning the black liquor in the recovery boiler, on the other hand, fine powder of some inorganic matters is recovered as ashes by the economizer in the recovery boiler and by the electric precipitator. The ashes usually contain common salt to some extent. The ashes are all recovered and are often reused in the recovery boiler as make-ups of sulfur and sodium components. In case the common salt accumulates in the system to adversely affect the boiler, however, the ashes are neutralized and are discarded away.

However, the ashes obtained through burning in the recovery boiler are composed as chief components of those inorganic matters that can be reused as industrial starting material. Therefore, discarding the ashes away arouses problems not only in economy but also from the standpoint of polluting environment. It is therefore desired to recover the ashes as much as possible to reuse them.

SUMMARY OF THE INVENTION

In order to solve the above-mentioned problems, the present inventors have conducted keen study and developed a method of producing caustic soda, carbonic acid and sulfuric acid using the ashes as starting materials, and have thus arrived at the invention.

That is, the present invention is concerned with a method of producing an acids and/or alkali comprising a step of burning a black liquor obtained by digesting wood chips, recovering the resultant ashes, dissolving the ashes in water to form an aqueous solution, if necessary subjecting the resultant aqueous solution prior to an electrodialysis, to a pretreatment for reducing the amount of polyvalent cations contained in the aqueous solution, subjecting said aqueous solution to the electrodialysis using an electrodialyzer which is constituted by a bipolar membrane and a cation-exchange membrane and/or an anion-exchange membrane, and recovering the obtained acid and/or alkali as in an aqueous solution.

DESCRIPTION OF THE PREFERRED EMBODIMENTS

Figure 1:
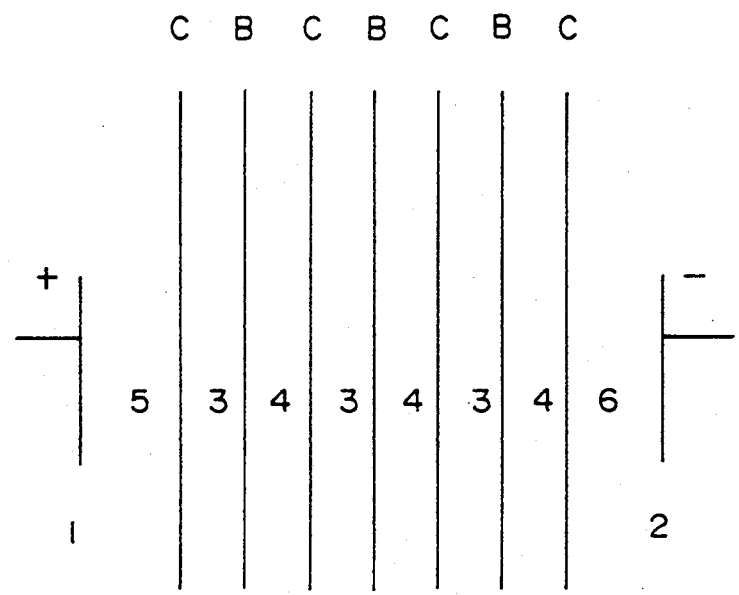
FIG. 1 is a schematic diagram of a two-compartment type electrodialyzer.

According to the present invention, the digestion of wood chips, recovery of components contained in the black liquor obtained by digestion, and combustion of the components, can be carried out by the widely known methods without imposing any limitation. Concretely speaking, the wood chips are digested in an aqueous solution containing 10 to 20% of sodium sulfide and caustic soda under a pressure of 5 to 10 kg/cm$^2$ at a temperature of 130° C. to 180° C. for 2 to 6 hours. Due to this digestion, lignin contained in the wood is eluted out.

Then, the water content in the black liquor is evaporated and the liquor is concentrated by a known means such as a vacuum evaporator so that the solid content is 50 to 80%. Then, the organic matters contained in the concentrated black liquor are utilized as fuel to burn the component in the recovery boiler. The ashes produced at this time are mostly recovered as smelts from the lower part of the recovery boiler, but some are recovered as dusts by the economizer or the electric precipitator. According to the method of the invention, the ashes recovered by the economizer or the electric precipitator can be favorably used as starting materials, It is, of course, allowable to use the ashes recovered from the lower portion of the recovery boiler as starting materials for the present invention.

According to the analysis conducted by the present inventors, it was found that the ashes recovered by the economizer or the electric precipitator are composed of sodium sulfate and sodium carbonate as main components, as well as a small amount of common salt and trace amounts of calcium, magnesium, sodium silicate, ions, etc.

According to the present invention, the thus obtained ashes are dissolved in water to obtain an aqueous solution thereof which is then subjected to the electrodialysis by using bipolar membranes and cation-exchange membranes and/or anion-exchange membranes. Though there is no particular limitation in the amount of water that is used, it is desired that the ashes are dissolved in the aqueous solution at a high concentration since it enables the cell voltage to be low during the electrodialysis by using the bipolar membranes and the cation-exchange membranes and/or the anion-exchange membranes.

In the present invention, the aqueous solution containing the above ashes can be directly subjected to the electrodialysis using the bipolar membranes and the cation-exchange membranes and/or the anion-exchange membranes. It is, however, desired to treat the aqueous solution of the ashes in advance, since trace amounts of components contained in the aqueous solution of the ashes may be deposited during the electrodialysis to hinder the electrodialysis that is carried out by using the bipolar membranes and the cation-exchange membranes and/or the anion-exchange membranes. The following methods are favorably employed as the pretreatment methods.

(1) A strong base is added to the aqueous solution of the ashes until pH is 11 or greater, so that polyvalent cations are precipitated as hydroxides. Polyvalent cations such as calcium ions and magnesium ions in the aqueous solution of the ashes subjected to the electrodialysis using bipolar membrane form hydroxides in an alkaline aqueous solution and becomes insoluble and should, hence, be contained at a concentration as low as possible and usually at a concentration of not more than several ppm and, preferably, at a concentration of smaller than 1 ppm.

Relying upon the above-mentioned method (1), calcium ions and magnesium ions in the aqueous solution are precipitated as carbonates and hydroxides, and are isolated by such a method as filtration or centrifuge, so that the ion concentration decreases.

(2) The solution obtained above is treated with a chelating resin in order to further decrease the concentrations of calcium ions and magnesium ions.

(3) The aqueous solution of the ashes is filtrated through a filter having a pore diameter of smaller than 0.5 microns. By combining this method with the above-mentioned method (1), it is allowed to remove hydroxides of calcium and magnesium. This method further makes it possible to remove insoluble suspensions contained in the aqueous solution of the ashes as well as to remove color from the aqueous solution of the ashes.

(4) To the aqueous solution of the ashes is added under stirring an aqueous solution in which iron ions have been dissolved in advance at a concentration of 10 to 500 ppm. This method makes it possible to easily coagulate and precipitate the suspensions contained in the aqueous solution of the ashes. Moreover, combination of this method with the method (3) makes it possible to greatly increase the filtering rate of the method (3) and to decrease the polyvalent ions in the filtrate.

(5) The aqueous solution of the ashes is brought into contact with an anion-exchange resin or activated carbon in advance. This method permits the electrodialysis to be contained without the need of increasing the cell voltage during the electrodialysis using bipolar membrane.

According to the present invention, the above-mentioned pretreatment methods (1) to (5) may be carried out separately or in combination.

The thus-obtained aqueous solution of the ashes is subjected to the electrodialysis using the bipolar membrane as well as the cation-exchange membrane and/or the anion-exchange membrane. The electrodialyzer used for the electrodialysis with bipolar membrane may be that of the widely known two-compartment type or the three-compartment type without imposing any limitation.

In the two-compartment type electrodialyzer with bipolar membrane, the side of the anion-exchange membrane side of the bipolar membrane is faced toward the anode, the side of the cation-exchange membrane side is faced toward the cathode, and the cation-exchange membrane (or the anion-exchange membrane) is placed between a bipolar membrane and another bipolar membrane. Then, an electric field is applied across the two electrodes so that the dissociation of water takes place at an interface between the anion-exchange membrane side and the cation-exchange membrane side of the bipolar membrane, generating hydroxyl ions on the anion-exchange membrane side and hydrogen ions on the cation-exchange membrane side.

FIG. 1 is a schematic diagram of a two-compartment type electrodialyzer with bipolar membrane which uses bipolar membranes and cation-exchange membranes. In FIG. 1, bipolar membranes (B) and cation-exchange membranes (C) are alternatingly installed between an anode 1 and a cathode 2. A compartment 3 defined by the cation-exchange membrane and the anion-exchange membrane side of the bipolar membrane is called alkali compartment and is usually served with water or a dilute alkali aqueous solution. Though there is no particular limitation, the alkali aqueous solution fed to the compartment 3 has a concentration of usually 0.001 to 3.0N and, preferably, 0.1 to 1.0N. A compartment 4 defined by the cation-exchange membrane and the cation-exchange membrane side of the bipolar membrane is called acid-salt mixture compartment which is usually served with an aqueous solution of a salt. An acid is formed in this compartment and whereby a mixture aqueous solution of acid and salt is obtained. Though there is no particular limitation, the mixture aqueous solution of salt fed to the compartment 4 has a concentration which is usually 0.1 to 5N and is, preferably, 1 to 4.5N.

Figure 2:
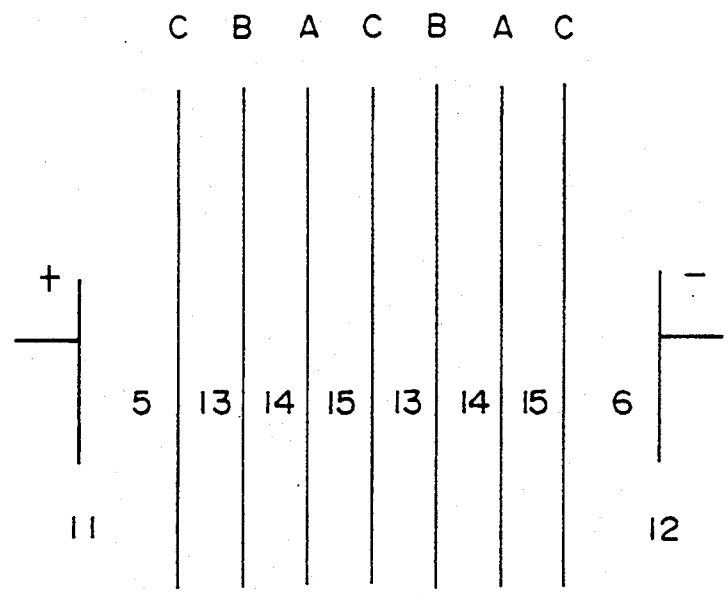
FIG. 2 is a schematic diagram of a three-compartment type electrodialyzer.

FIG. 2 is a schematic diagram of a three-compartment type electrodialyzer with bipolar membrane. The three-compartment type electrodialyzer with bipolar membrane uses three kinds of membranes, i.e., a bipolar membrane (B), an anion-exchange membrane (A) and a cation-exchange membrane (C), and has three compartments for alkali, acid and salt. Here, a compartment between the cation-exchange membrane (C) and the bipolar membrane (B) is referred to as an alkali compartment 13, a compartment between the bipolar membrane (B) and the anion-exchange membrane (A) is referred to as an acid compartment 14, and a compartment between the anion-exchange membrane (A) and the cation-exchange membrane (C) is referred to as a salt compartment 15. A representative constitution of the electrodes and membranes will be anode —(—C—B—A—)$_n$—C— cathode (where n is a number of unit cells of the cation-exchange membrane, bipolar membrane and anion-exchange membrane that are serially arranged repetitively). Here, the side of the anion-exchange membrane of the bipolar membrane is usually faced toward the anode and the side of the cation-exchange membrane is faced toward the cathode.

The bipolar membrane used in the present invention is a composite ion-exchange membrane having a structure in which the cation-exchange membrane and the anion-exchange membrane are lined together. Any widely known membrane can be used as such a bipolar membrane without any limitation. The following methods of production have been known. That is, a method in which a cation-exchange membrane and an anion-exchange membrane are lined together with a mixture of polyethyleneimine and epichlorohydrin, and are cured and adhered together (Japanese Patent Publication No. 3962/1957), a method in which a cation-exchange membrane and an anion-exchange membrane are adhered together with an ion-exchange adhesive agent (Japanese Patent No. 3961/1959), a method in which a cation-exchange membrane and an anion-exchange membrane are press-adhered together by applying a fine powdery ion-exchange resin or a paste-like mixture of a thermoplastic material and an anion- or cation-exchange resin (Japanese Patent Publication No. 14531/1960), a method in which the surface of a cation-exchange membrane is coated with a paste-like substance followed by irradiation with radioactive rays (Japanese Patent Publication No. 16633/1963), a method according to which a sulfonic acid-type high molecular electrolyte and allylamines are adhered onto the surface of the surface of the anion-exchange membrane which is then irradiated with ionizing radiation to effect the crosslinking (Japanese Patent Publication No. 4113/1976), a method according to which a mixture of a dispersion system of an ion-exchange resin having electric charge of a polarity opposite to the ion-exchange membrane and a matrix polymer, is sedimented on the surface of the ion-exchange membrane (Japanese Laid-Open Patent Publication No. 37190/1978), a method in which a sheet-like material obtained by impregnating and polymerizing a polyethylene film with styrene and divinylbenzene is held by a stainless steel frame and one side thereof is sulfonated, the sheet is then taken out, and the remaining portion is chloromethylated and is then aminated (U.S. Pat. No. 3562139), and a method in which the interface between the anion-exchange membrane and the cation-exchange membrane is treated with an inorganic compound to join the two membranes together (Japanese Laid-Open Patent Publication No. 47235/1984).

There is no particular limitation on the cation-exchange membrane that is used in the present invention, and any known cation-exchange membrane can be used. For instance, there can be used a cation-exchange membrane having a sulfonic acid group, a carboxylic acid group, a phosphonic acid group, a sulfuric ester group or a phosphoric ester group, or having a plurality of these ion-exchange groups in combination. Moreover, the cation-exchange membrane can be used in any kind or type irrespective of whether it is of the polymerization polymer type, condensation polymer type, homogeneous type or non-homogeneous type, or irrespective of whether it is a reinforced membrane or not, whether it is of the hydrocarbon type or the fluorine-containing type, or irrespective of its starting materials and method of production. Moreover, the cation-exchange membrane used in the present invention may be even the one which is generally called amphoteric ion-exchange membrane provided it is capable of electrically dialyzing a 2N common salt aqueous solution at a current density of 5 $A/dm^2$ and substantially functions as a cation-exchange membrane having a current efficiency which is greater than 70%.

There is no particular limitation in the anion-exchange membrane that is used in the present invention, and a widely known anion-exchange membrane can be used. For instance, there can be used an anion-exchange membrane having a quaternary ammonium group, a primary amino group, a secondary amino group, a tertiary amino group, or having a plurality of these ion-exchange groups in combination. Moreover, the anion-exchange membrane can be used in any kind or type irrespective of whether it is of the polymerization polymer type, condensation polymer type, homogeneous type or non-homogeneous type, or irrespective of whether it is a reinforced membrane or not, whether it is of the hydrocarbon type or the fluorine-containing type, or irrespective of its starting materials and method of production. Furthermore, the anion-exchange membrane used in the present invention may be even the one which is generally called amphoteric ion-exchange membrane provided it is capable of electrically dialyzing a 2N common salt solution at a current density of 5 $A/dm^2$ and substantially functions as an anion-exchange membrane having a current efficiency of greater than 70%. The anion-exchange membrane has a tendency of permitting acids to pass through. It is therefore desired to use an anion-exchange membrane that little permits acids to pass through.

In the present invention, the aqueous solution of the ashes is fed to the acid-salt mixture compartment or to the alkali-salt mixture compartment in the case of the two-compartment type electrodialyzer, and is fed to the salt compartment in the case of the three-compartment type electrodialyzer.

According to the electrodialysis method of the present invention, the salt compartment, acid compartment, alkali compartment, acid-salt mixture compartment and alkali-salt mixture compartment are provided with tanks for feeding liquids to their respective compartments, and the liquids to be fed to the compartments are circulated between their respective compartments and the tanks.

The acid or alkali that is formed can be favorably taken out by the methods described below.

1. A so-called batchwise method according to which, when the two-compartment type electrodialyzer is used, an aqueous solution of salt is fed beforehand to the acid-salt mixture compartment or to the alkali-salt mixture compartment in order to form acid or alkali and, when a predetermined concentration is reached, the acid-salt mixture liquid or the alkali-salt mixture liquid is taken out by a predetermined amount and the aqueous solution of salt is replenished and when the three-compartment type electrodialyzer is used, a dilute acid or alkali aqueous solution is fed to the acid compartment and to the alkali compartment to form acid or alkali and when a predetermined concentration is reached, the aqueous solution is taken out by a predetermined amount, and water is replenished to maintain a predetermined acid or alkali concentration.

2. A continuous method according to which, when the two-compartment type electrodialyzer is used, an aqueous solution of salt is fed beforehand to the acid-salt mixture compartment or to the alkali-salt mixture compartment in order to form acid or alkali, and the aqueous solution of salt is continuously fed while the electric current is supplied depending upon the amount of electric current that is supplied, such that the acid-salt mixture solution or the alkali-salt mixture solution of a predetermined concentration is permitted to overflow and when the three-compartment type electrodialyzer is used, an acid or alkali aqueous solution of a predetermined concentration is fed beforehand to the acid compartment and to the alkali compartment, and water is continuously fed while the salt is supplied depending upon the amount of electric current that is supplied, such that the acid or alkali aqueous solution of the predetermined concentration is permitted to overflow.

When the electrodialysis is carried out according to the present invention by using the two-compartment type electrodialyzer and by feeding the aqueous solution of ashes to the acid-salt mixture compartment, sodium carbonate is neutralized by the acid that is formed first and carbon dioxide gas evolves. The carbon dioxide gas evolving at this moment has a very high purity and can be used for such applications that need a carbon dioxide gas of a high purity. For instance, the carbon dioxide gas is sent to a step of producing calcium carbonate of high quality.

When the electrodialysis is to be carried out using the bipolar membrane, the liquids should have a temperature of usually 5° to 70° C. and, preferably from 20° to 50° C. Moreover, though there is no particular limitation, the current density should be generally from 1 to 30 A/dm² and, preferably, from 3 to 20 A/dm².

According to the present invention, the pH value of the acid-salt mixture solution in the acid-salt mixture compartment should be continuously or intermittently adjusted to be smaller than 1 in the case of the two-compartment type electrodialyzer, and the pH value of the aqueous solution of salt in the salt compartment should be continuously or intermittently adjusted to be smaller than 1 in the case of the three-compartment electrodialyzer, so that the electrodialysis with bipolar membrane can be smoothly carried out for extended periods of time. This enables calcium ions and magnesium ions contained in the acid-salt mixture solution or in the salt aqueous solution to reach the alkali chamber passing through the cation-exchange membrane even when the acid-salt mixture solution or the salt aqueous solution containing polyvalent ions in slightly large amounts is fed to the acid-salt mixture compartment. Therefore, the membrane is not damaged by the formation of water-insoluble salts, and the electrodialysis with bipolar membrane can be smoothly carried out for extended periods of time.

The method of adjusting the pH value of the acid-salt mixture solution in the acid-salt mixture compartment or of the salt aqueous solution in the salt compartment to be continuously or intermittently smaller than 1, usually, comprises feeding the acid-salt mixture solution or the salt aqueous solution whose pH value is adjusted to be smaller than 1 by the addition of acid to the acid-salt mixture compartment or to the salt compartment. The acid that is added to continuously or intermittently adjust the pH value to be smaller than 1 should desirably be the one having anions of the same kind as the salt but may, depending upon the cases, be an acid having anions of different kinds.

When the pH value of the acid-salt mixture solution or of the salt aqueous solution is too low, hydrogen ions pass through in large number through the cation-exchange membrane during the electrodialysis and cause the current efficiency to be greatly decreased. It is, therefore, desired that the pH value is intermittently over a range of from 0 to 0.95. In this case, it is desired that the time in which the pH value is smaller than 1 occupies 2 to 50% and, preferably 5 to 30% of the whole time of electrodialysis.

According to the present invention, the acids and alkalis are produced by burning the components contained in a black liquor obtained by digesting wood chips, and by decomposing the aqueous solution of the thus obtained ashes by the electrodialysis using a bipolar membrane. The formed acids and alkalis can be used in a separate step such as a bleaching step. Therefore, the present invention contributes greatly to saving resources and preventing environmental hazard.

The invention will be described more concretely by way of examples which are mentioned below to which only, however, the invention is in no way limited.

EXAMPLE 1

Wood chips were digested for 4 hours in an aqueous solution containing 15% of sodium sulfide and caustic soda under a pressure of 8 kg/cm² and at a temperature of 150° C. The obtained black liquor was evaporated by using a vacuum evaporator such that the solid content was 72%, and the solid content was recovered by concentration from the black liquor that was obtained by digestion. The organic matters contained in the recovered solid content were utilized as fuels and were burned in the recovery boiler. The ashes produced at this time were mostly recovered as smelts from the lower part of the recovery boiler but were partly recovered as dusts by an electric precipitator.

Two kg of the thus obtained ashes were dissolved in 8 kg of water. The pH value of the aqueous solution was 10.6. Caustic soda was dissolved in an amount of 12 g to adjust the pH value of the solution to be 11.5. The solution was left to stand still for one day and was filtered through a membrane filter having a pore size of 0.45 microns. The filtrate contained calcium ions and magnesium ions at concentrations of 3.2 ppm and 0.6 ppm, respectively.

An electrodialyzer with bipolar membrane was set up by using Neocepta BP-1 which is a bipolar membrane and a Neocepta CL-25T which is a cation-exchange membrane manufactured by Tokuyama Soda K.K.. The membrane was constituted as shown in FIG. 1 by alternatingly placing cation-exchange membranes (C) and bipolar membrane (B) in numbers of six pieces and five pieces, respectively, (cation-exchange membranes and bipolar membranes possessed effective membrane areas of 1 dm², respectively, and total membrane areas of 6 to 5 dm², respectively) between a pair of cathode and anode in order to form alkali compartments and acid-salt mixture compartments.

The solution obtained above was fed in an amount of 3.4 liters to the acid-salt mixture compartment in the bipolar membrane electrodialysis and an aqueous solution of 0.4% of sodium hydroxide was fed in an amount of 3.4 liters to the alkali compartment at a linear velocity of 6 cm/sec., respectively, and were circulated. Into the anode compartment 5 and the cathode compartment 6 was circulated an aqueous solution of 10% of caustic soda in an amount of 3 liters each. The electrodialysis was carried out at a current density of 10 A/dm² for 5.0 hours. The pH value in the acid-salt mixture compartment gradually decreased down to 0.90. Carbon dioxide gas has evolved in large amounts during the pH value decreased from 8 down to 2.

As a result, the aqueous solution of sodium hydroxide (containing 320 g of sodium hydroxide) was obtained in an amount of 3.8 liters from the alkali compartment, and a solution was obtained in an amount of 2.8 liters containing 163 g of sulfuric acid and 340 g of sodium sulfate from the acid-salt mixture compartment. In this case, the current efficiency for forming caustic soda was 82%. Moreover, the average cell voltage during this period was 1.8 volts. Therefore, the electric power consumption unit was 1470 kwh/t-NaOH.

EXAMPLE 2

A three-compartment type bipolar membrane electrodialyzer was set up as shown in FIG. 2 by using a anion-exchange membrane (AMH) manufactured by Tokuyama Soda K.K. in addition to using the bipolar membrane and the cation-exchange membrane (CL-25T) used in Example 1, and the same solution of ashes as the one used in Example 1 was used as follows.

A filter press type bipolar membrane electrodialyzer was constituted as shown in FIG. 2 by alternatingly placing cation-exchange membranes (C), bipolar membranes (B) and anion-exchange membranes (A) in numbers of six pieces, five pieces and five pieces, respectively, (cation-exchange membrane, bipolar membrane and anion-exchange membrane possessed effective membrane areas of 1 dm², respectively, and total membrane areas of 6.5 and 5 dm², respectively) between a pair of cathode and anode, thereby constituting alkali compartments 13, acid compartments 14 and salt compartments 15. Three liters of a 0.5% sulfuric acid aqueous solution was fed to the acid chambers, 3.4 liters of a solution obtained by pretreating the same aqueous solution of ashes as the one obtained in Example 1 was fed to the salt compartments, and 3.0 liters of a 0.4% sodium hydroxide aqueous solution was fed to the alkali compartments at a linear velocity of 6 cm/sec, respectively, and were circulated. Into the anode compartment 5 and the cathode compartment 6 was circulated an aqueous solution of 10% of caustic soda in an amount of 3 liters each. The electrodialysis was carried out at a current density of 10 A/dm² for 4.5 hours.

As a result, the aqueous solution of sodium hydroxide (containing 297 g of sodium hydroxide) was obtained in an amount of 3.5 liters from the alkali compartment, an aqueous solution of sulfuric acid (containing 296 g of sulfuric acid) was obtained from the acid compartment, and a solution was obtained in an amount of 1.9 liters containing 175 g of sodium sulfate and 124 g of sodium carbonate from the salt compartment. In this case, the current efficiency for forming caustic soda was 85%. The average cell voltage during this period was 3.4 volts. Therefore, the electric power consumption unit was 2680 kwh/t-NaOH.

The batchwise electrodialysis was repeated ten times but there was no change in the current efficiency and in the cell voltage.

EXAMPLE 3

Sulfuric acid was added to a pretreated solution of the same aqueous solution of ashes as that of Example 1, so that carbon dioxide gas evolved from the aqueous solution. The pH value of the solution was 0.95 and the concentration of calcium ions in the solution was 8 ppm. The obtained solution was fed to the same bipolar membrane electrodialyzer as that of Example 1.

The above aqueous solution was continuously added to the acid-salt mixture compartment. To the alkali compartment was fed sodium hydroxide which had been adjusted 2N by continuously adding water and was circulated at renear velocity of 6 cm/sec., respectively, and into the anode compartment and the cathode compartment was circulated a 2N aqueous solution of sodium sulfate. The electrodialysis was carried out at a current density of 10 A/dm². As a result, the cell voltage was 1.3 volts. The operation was continued for 10 days and the current efficiency for producing caustic soda was 60% which did not change et all.

EXAMPLE 4

The same aqueous solution of ashes as that of Example 1 was left to stand still one day and was filtered through a filter having a pore diameter of 0.45 microns. The concentrations of calcium ions and magnesium ions in the solution were 4.3 ppm and 1.7 ppm, respectively.

Use was made of the same three-compartment type bipolar membrane electrodialyzer as that of Example 2. To the acid compartment was fed and circulated sulfuric acid which has been adjusted to 2N by continuously adding water, to the salt compartment was fed and circulated the aqueous solution of ashes, and to the alkali compartment was fed and circulated the aqueous solution of sodium hydroxide which has been adjusted to 2N by continuously adding water, at a linear velocity of 6 cm/sec., respectively. Into the anode compartment and cathode compartment was circulated a 2N aqueous solution of caustic soda. During the electrodialysis, sulfuric acid was added once a day to the salt chamber in order to maintain the pH value in the salt chamber at 0.3 to 0.8 for one hour. The electrodialysis was carried out at 40° C. at a current density of 10 A/dm² for 10 days. As a result, the cell voltage was 3.4 volts and did not at all change. The current efficiency for producing caustic soda was 80% and did not change.

EXAMPLE 5

Two kg of the ashes obtained in the same manner as in Example 1 were dissolved in 7 kg of water. Into this solution was gradually thrown 1 kg of water that contained 100 mg of ferous chloride with stirring. After left to stand still for one day, the solution was filtered through a filter having a pore diameter of 0.45 microns. The concentrations of calcium ions and magnesium ions in the solution were 1.2 and 0.2 ppm, respectively. By using the same ion-exchange membranes and the electrodialyzer as those of Example 2, the electrodialysis was batchwisely repeated 40 times in the same manner as in Example 2 but without adding sulfuric acid to the salt compartment. As a result, the current efficiency for producing caustic soda was 85% at the first and was 84% at the end.

We claim:

1. A method of producing an acid or alkali comprising a step of burning a black liquor obtained by digesting wood chips, recovering the resultant ashes, dissolving the ashes in water to form an aqueous solution, subjecting said aqueous solution to electrodialysis using an electrodialyzer which is constituted by bipolar membrane and a cation-exchange membrane or an anion-exchange membrane to obtain an acid or alkali, wherein the resultant ash is an ash recovered by an economizer or an electric precipitator of a recovery boiler at the time of burning the black liquor by the recovery boiler and contains sodium sulfate and sodium carbonate as main components, and recovering the obtained acid or alkali as an aqueous solution.

2. A method according to claim 1 wherein the black liquor has the solid content of 50 to 80% by weight.

3. A method according to claim 1 wherein the black liquor is obtained by digesting the wood chips in an aqueous solution containing sodium sulfide and caustic soda in total amount of 10 to 20% by weight at a temperature of 130° to 180° C. for 2 to 6 hours and if necessary concentrating the resultant liquor by evaporation.

4. A method according to claim 1 wherein said electrodialyzer comprising a plurality of pair of the bipolar membrane and the cation-exchange membrane installed alternatingly between an anode and a cathode, an alkali compartment defined by the cation-exchange membrane and the anion-exchange membrane side of the bipolar membrane and an acid-salt mixture compartment defined by the cation-exchange membrane and the cation-exchange membrane side of the bipolar membrane, and that the electrodialysis is carried out by introducing the aqueous solution into the acid-salt mixture compartment, introducing a water or a dilute alkali aqueous solution, and recovering the separated alkali from the alkali compartment.

5. A method according to claim 4 wherein the electrodialysis is carried out while the pH of the acid-salt mixture in the acid-salt mixture compartment is adjusted continuously or intermittently to less than 1.

6. A method according to claim 4 wherein the electrodialysis is carried out at a temperature of 5° to 70° C. in a current density of 1 to 30 A/dm$^2$.

7. A method according to claim 6 wherein the electrodialysis is carried out while the pH of salt aqueous solution in the salt compartment is adjusted continuously or intermittently to less than 1.

8. A method according to claim 1 wherein said electrodialyzer comprising electrodes and membranes have a constitution represented by the following formula:

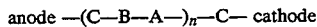

where, B represents a bipolar membrane, A represents an anion-exchange membrane and, C represents a cation-exchange membrane, and n is a number of unit cells of the cation-exchange membrane, bipolar membrane and anion-exchange membrane that are serially arranged repetitively; an alkali chamber between the cation-exchange membrane (C) and the bipolar membrane (B), an acid compartment between the bipolar membrane (B) and the anion-exchange membrane (A), and a salt compartment between the anion-exchange membrane (A) and the cation-exchange membrane (C) and that the electrodialysis is carried out by introducing the aqueous solution into the salt compartment and recovering the separated alkali from the alkali compartment and the separated acid from the acid compartment respectively.

9. A method according to claim 8 wherein the electrodialysis is carried out at a temperature of 5° to 70° C. in a current density of 1 to 30 A/dm$^2$.

10. A method of producing an acid or alkali comprising a step of burning a black liquor obtained by digesting wood chips, recovering the resultant ashes, dissolving the ashes in water to form an aqueous solution, subjecting the resultant aqueous solution, prior to an electrodialysis, to a pretreatment for reducing the amount of polyvalent cations contained in the aqueous solution, subjecting said pretreated solution to the electrodialysis using an electrodialyzer which is constituted by a bipolar membrane and a cation-exchange membrane or an anion-exchange membrane to obtain an acid or alkali, wherein the resultant ash is an ash recovered by an economizer or an electric precipitator of a recovery boiler at the time of burning the black liquor by the recovery boiler and contains sodium sulfate and sodium carbonate as main components and recovering the obtained acid or alkali as an aqueous solution.

11. A process according to claim 10 wherein the pretreatment is carried out by adding a strong base to the aqueous solution until pH is 11 or greater to precipitate polyvalent cations as hydroxide.

12. A process according to claim 10 wherein the pretreatment is carried out by treating the aqueous solution with a chelating resin.

13. A process according to claim 10 wherein the pretreatment is carred out by filtrating the aqueous solution through a filter having a pore diameter of greater than 0 and smaller than 0.5 microns.

14. A process according to claim 10, wherein the pretreatment is carried out by adding to the aqueous solution an aqueous solution containing iron ions at a concentration of 10 to 500 ppm with stirring.

15. A process according to claim 10 wherein the pretreatment is carried out by bringing the aqueous solution into contact with an anion-exchange resin or an activated carbon.

16. A method of producing an acid or alkali or both comprising a step of burning a black liquor obtained by digesting wood chips in an aqueous solution containing sodium sulfide and caustic soda in total amount of 10 to 20% by weight at a temperature of 130° to 180° C. for 2 to 6 hours and concentrating the resultant liquor by evaporation, burning the black liquor in a recovery boiler having an economizer or an electric precipitator or both, recovering the resultant ashes which contain sodium sulfate and sodium carbonate as main components in the economizer or electric precipitator or both at the time of burning the black liquor, dissolving the ashes in water to form an aqueous solution, subjecting said aqueous solution to the electrodialysis using an electrodialyzer which is constituted by a bipolar membrane and a cation-exchange membrane, or an anion-exchange membrane or both, wherein said electrodialyzer comprising a plurality of pairs of the bipolar membrane and the cation-exchange membrane installed alternatingly between an anode and a cathode, an alkali compartment defined by the cation-exchange membrane and the anion-exchange membrane side of the bipolar membrane and an acid-salt mixture compartment defined by the cation-exchange membrane and the cation-exchange membrane side of the bipolar membrane, and that the electrodialysis is carried out by introducing the aqueous solution into the acid-salt mixture compartment, introducing a water or a dilute alkali aqueous solution, and recovering the separated alkali from the alkali compartment.

17. A method according to claim 16 wherein the electrodialysis is carried out while the pH of the acid-salt mixture in the acid-salt mixture compartment is adjusted continuously or intermittently to more than 0 and less than 1.

18. A method of producing an acid or alkali or both comprising a step of burning a black liquor obtained by digesting wood chips in an aqueous solution containing sodium sulfide and caustic soda in total amount of 10 to 20% by weight at a temperature of 130° to 180° C. for 2 to 6 hours and concentrating the resultant liquor by evaporation, burning the black liquor in a recovery boiler having an economizer or an electric precipitator or both, recovering the resultant ashes which contain sodium sulfate and sodium carbonate as main components in the economizer or electric precipitator or both at the time of burning the black liquor, dissolving the ashes in water to form an aqueous solution, subjecting said aqueous solution to the electrodialysis using an electrodialyzer which is constituted by a bipolar membrane and a cation-exchange membrane or an anion-exchange membrane or both, wherein said electrodialyzer comprising electrodes and membranes has a constitution represented by the following formula:

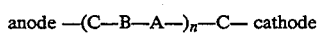

where, B represents a bipolar membrane, A represents an anion-exchange membrane and C represents a cation-exchange membrane, and n is a number of unit cells of the cation-exchange membrane, bipolar membrane and anion-exchange membrane that are serially arranged repetitively; an alkali chamber between the cation-exchange membrane (C) and the bipolar membrane (B), an acid compartment between the bipolar membrane (B) and the anion-exchange membrane (A) and the cation-exchange membrane (C) and that the electrodialysis is carried out by introducing the aqueous solution into the salt compartment and recovering the separated alkali from the alkali compartment and the separated acid from the acid compartment respectively.

19. A method according to claim 18 wherein the electrodialysis is carried out while the pH of salt aqueous solution in the salt compartment is adjusted continuously or intermittently to more than 0 and less than 1.

* * * * *